US 6,835,493 B2

(12) United States Patent
Zhang et al.

(10) Patent No.: US 6,835,493 B2
(45) Date of Patent: Dec. 28, 2004

(54) THIN FILM BATTERY

(75) Inventors: Ji-Guang Zhang, Marietta, GA (US);
Steve Buckingham, Newnan, GA (US);
Lonnie G. Johnson, Atlanta, GA (US)

(73) Assignee: Excellatron Solid State, LLC, Atlanta, GA (US)

( * ) Notice: Subject to any disclaimer, the term of this patent is extended or adjusted under 35 U.S.C. 154(b) by 149 days.

(21) Appl. No.: 10/207,445

(22) Filed: Jul. 26, 2002

(65) Prior Publication Data

US 2004/0018424 A1 Jan. 29, 2004

(51) Int. Cl.⁷ .......................... H01M 10/36; H01M 4/02
(52) U.S. Cl. ..................... 429/162; 429/127; 429/208; 429/209
(58) Field of Search ............... 429/162, 127, 429/208, 209

(56) References Cited

U.S. PATENT DOCUMENTS

| 4,588,804 | A | * | 5/1986 | Fryd .......................... 528/125 |
| 5,597,660 | A | * | 1/1997 | Bates et al. ................. 429/322 |
| 5,601,941 | A | * | 2/1997 | Tuttle ......................... 429/121 |
| 5,705,293 | A | * | 1/1998 | Hobson ...................... 429/162 |
| 6,632,563 | B1 | * | 10/2003 | Krasnov et al. ............ 429/162 |

* cited by examiner

Primary Examiner—John S. Maples
(74) Attorney, Agent, or Firm—Baker Donelson

(57) ABSTRACT

A rechargeable, thin film lithium battery cell (10) is provided having a polyimide supporting substrate (11), a cathode current collector (13), a lithiated transition metal oxide or transition metal cathode (14), an electrolyte (15), an anode (16) and an anode current collector (17). The polyimide supporting substrate (11) is heated or dehydrated to remove water from therein. The cathode (14) is annealed at a relatively low temperature of approximately 300 degrees Celsius.

13 Claims, 3 Drawing Sheets

THIN FILM BATTERY

TECHNICAL FIELD

This invention relates generally to thin film batteries, and more particularly to thin film, rechargeable lithium ion batteries.

BACKGROUND OF THE INVENTION

Conventional, canister type batteries today includes toxic materials such as cadmium, mercury, lead and acid electrolytes. These chemicals are presently facing governmental regulations or bans as manufacturing materials, thus limiting their use as battery components. Another limitation associated with them is that the amount of energy stored and delivered by these batteries is directly related to their size and weight. Large batteries, such as those found in automobiles, produce large amounts of current but have very low energy densities (Watts hours per liter) and specific energies (Watt hours per gram). As such, they require lengthy recharge times which render them impractical for many uses.

To address the need for higher energy densities and specific energies, the battery industry has been moving towards lithium based batteries. The major focus of the battery industry has been on liquid and polymer electrolyte systems. However, these systems have inherent safety problems because of the volatile nature of the electrolyte solvents. These types of batteries have a relatively high ratio of inert material components, such as the current collector, separator, and substrate, relative to the active energy storage materials used for the anode and cathode. In addition, their relatively high internal impedance results in low rate capability (watts/kilogram) which renders them insufficient for many applications.

Thin film lithium batteries have been produced which have a stacked configuration of films commencing with an inert ceramic substrate upon which a cathode current collector and cathode is mounted. A solid state electrolyte is deposited upon the cathode, an anode in turn deposited upon the electrolyte, and an anode current collector mounted upon the anode. Typically, a protective coating is applied over the entire cell. Lithium batteries of this type are describe in detail in U.S. Pat. Nos. 5,569,520 and 5,597,660, the disclosures of which are specifically incorporated herein. The lithiated cathode material of these batteries have a (003) alignment of the lithium cells, as shown in FIG. 1, which creates a high internal cell resistance resulting in large capacity losses.

Recently, it has been discovered that the annealing of lithiated cathode materials on a substrate under proper conditions results in batteries having significantly enhanced performances, for the annealing causes the lithiated material to crystallize. This crystallized material has a hexagonal layered structure in which alternating planes containing Li and Co ions are separated by close packed oxygen layers. It has been discovered that $LiCoO_2$ films deposited onto an alumina substrate by magnetron sputtering and crystallized by annealing at 700° C. exhibit a high degree of preferred orientation or texturing with the layers of the oxygen, cobalt and lithium are oriented generally normal to the substrate, i.e. the (101) plane as shown in FIG. 2. This orientation is preferred as it provides for high lithium ion diffusion through the cathode since the lithium planes are aligned parallel to the direction of current flow. It is believed that the preferred orientation is formed because the extreme heating during annealing creates a large volume strain energy oriented generally parallel to the underlying rigid substrate surface. As the crystals form they naturally grow in the direction of the least energy strain, as such the annealing process and its resulting volume strain energy promotes crystal growth in a direction generally normal to the underlying substrate surface, which also is the preferred orientation for ion diffusion through the crystal.

However, the limitations of these batteries have been the thickness and weight of their substrates upon which the layers of active material are laid upon. Because of the size of the substrate, these batteries have not been competitive with other formulations in terms of energy density and specific energy. High energy density cells have not been successfully constructed. The supporting substrates have been made of relatively thick sheets of alumina, sapphire, silica glass, and various other types of ceramic material. The substrate of these batteries typically constitute more than 95% of the total weight and an even larger percentage of the volume, thus only a small amount of the battery weight and volume is attributed to the active materials. This ratio of active material to the overall weight and volume of the battery limits their use. Furthermore, ceramic substrates and the like are generally inflexible. As such, these ceramic substrates can not be utilized to form batteries which are placed in a position where they may be bent, such as in "smart card" applications.

Based on the prior art (as taught in Characterization of Thin-Film Rechargeable Lithium Batteries With Lithium Cobalt Oxide Cathodes, in the Journal of The Electrochemical Society, Vol. 143, No 10, by B. Wang, J. B. Bates, F. X. Hart, B. C. Sales, R. A. Zuhr and J. D. Robertson), $liCoO_2$ annealed at a temperature below 600° C. has no significant change in the microstructure, and thus the lithium orientation remains amorphous. This amorphous state restricts lithium ion diffusion through the layers of oxygen and cobalt, and therefore creates a high internal cell resistance resulting in large capacity losses.

Hence, in order to anneal the lithiated cathode material to the most efficient orientation it was believed that the cathode had to be bonded to a rigid substrate and heated to nearly 700° C. for an extended period of time. Because of such extreme heating, it was believed that only certain metals with high melting points could be used as the cathode current collector. A problem associated with these metals has been their inability to bond with the substrate material, as these metals "de-wet" thereby forming small pools upon the substrate surface. As such, cathode current collectors have been made of cobalt overlaid with a layer of gold or platinum. During the annealing process the cobalt becomes a transition ion which is pulled through the gold or platinum and into the cathode material, thereby leaving the gold or platinum layer as the current collector.

It was believed that lightweight, low melting point metals and polymers could not survive the annealing process and therefore could not be used as a substrate in thin film lithium batteries having crystallized cathodes. This was a common belief even though such other materials would be chemically compatible for use with lithium cathodes. In addition, because of the high shrinking coefficient of polymers it was very difficult to use polymer in the construction of thin film batteries, as shrinkage causes a separation between the polymer and the overlying battery components.

It thus is seen that a need remains for a high performance rechargeable, thin film lithium battery which is smaller and lighter than those of the prior art. Accordingly, it is to the provision of such that the present invention is primarily directed.

SUMMARY OF THE INVENTION

In a preferred form of the invention, a thin film lithium battery comprises a polyimide support substrate, a cathode current collector mounted upon the polyimide support substrate, a crystallized lithium intercalation compound cathode coupled to the cathode current collector, an electrolyte deposited upon the lithium intercalation compound cathode, an anode deposited upon the electrolyte, and an anode current collector coupled to the anode.

DETAILED DESCRIPTION

Figure 2:
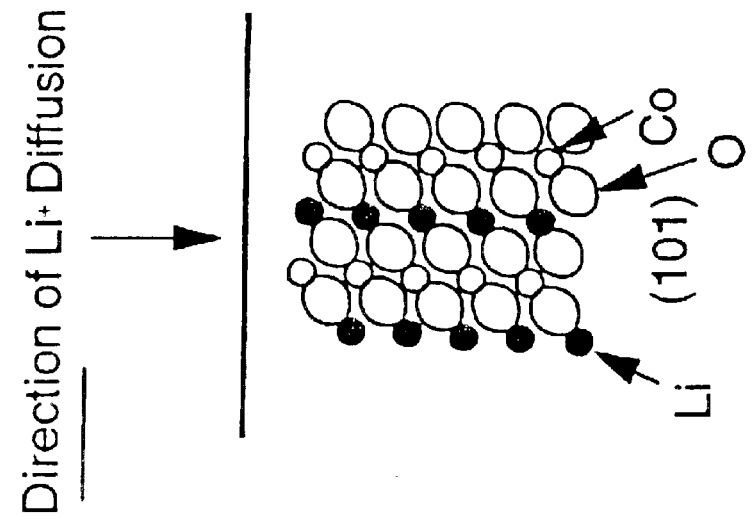
FIG. 2 is an illustration of a lithium intercalation compound oriented along the preferred (101) plane.
Figure 1:
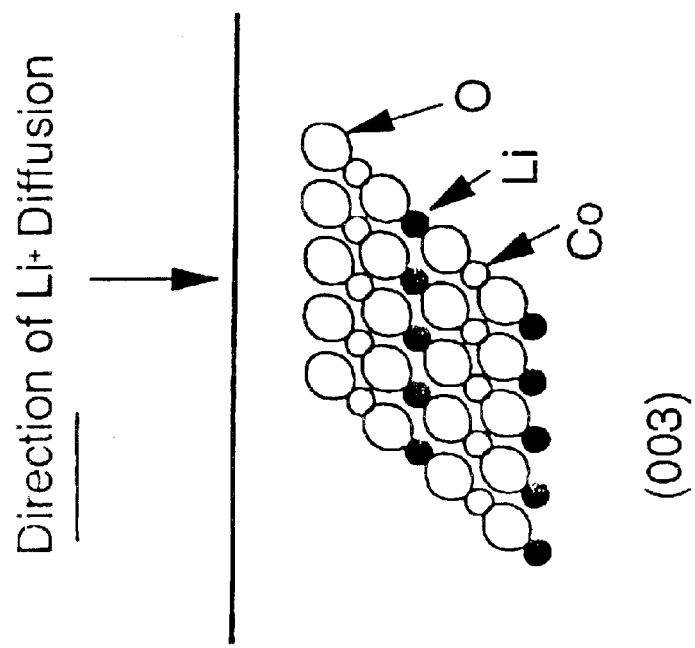
FIG. 1 is an illustration of a lithium intercalation compound oriented along the (003) plane.
Figure 3:
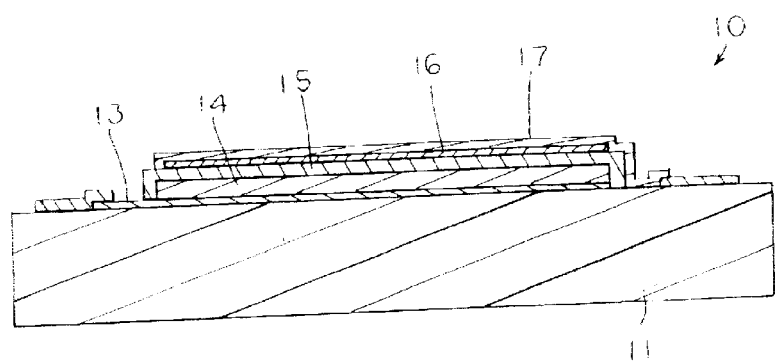
FIG. 3 is a cross-sectional view of a thin film lithium battery illustrating principles of the invention in a preferred embodiment.

With reference next to FIG. 3 of the drawings, there is shown in a rechargeable, thin film lithium battery cell 10 embodying principles of the invention in a preferred form. The battery cell 10 has a polyimide supporting substrate 11, a passivation layer coating upon the polyimide substrate 11, a cathode current collector 13, a cathode 14 mounted in electrical contact with the cathode current collector 13, an electrolyte 15 mounted upon the cathode 14, an anode 16 mounted upon the electrolyte 15, and an anode current collector 17 mounted in electrical contact with the anode 16. The polyimide supporting substrate 11 is a poly (pyromellitimide-1, 4-diphenyl ether) such as that made by Dupont under the trade name Kapton. Preferably, the supporting substrate is a type FPC-KN Kapton layer having a thickness of 25 microns to 75 microns. The passivation layer may be a layer of LiPON (lithium phosphorus oxynitride, typically $Li_{2.9}PO_{3.3}N_{0.46}$) or parylene. The cathode current collector is preferably made of nickel, but may also be made of another metal such as gold, platinum, cobalt, vanadium, or manganese. The cathode 12 is made of a lithium intercalation compound, preferably a metal oxide such as $LiCoO_2$, $LiNiO_2$, $V_2O_5$, $V_6O_{13}$, $Li_xMn_2O_4$, $TiS_2$ or other similar material. The electrolyte is preferably a solid-state electrolyte 15 such as LiPON. The anode 14 is preferably made of a tin-nitride ($Sn_3N_4$) or lithium metal layers. Finally, the anode current collector 16 is preferably made of copper, nickel, gold, or other suitable metals.

The battery cell 10 is preferably manufactured in the following manner. A polyimide supporting substrate 11 is subjected to temperatures of 350 degrees Celsius for approximately one hour. The polyimide supporting substrate is heated in this manner in order to reduce the water content within the polyimide supporting substrate. This dehydrating of the polyimide supporting substrate greatly reduces its shrinkage during subsequent battery cell construction steps wherein the substrate 11 is subjected to heat. The reduction in shrinkage of the supporting substrate reduces the curling effect upon the polyimide supporting substrate caused by the difference in the shrinking coefficient between the supporting substrate and the overlying battery cathode current collector. The preheated or dehydrated polyimide supporting substrate is then soaked in acetone and then rinse/wiped in isopropanol and stored in a dry environment until it is ready to be used in the manufacturing process.

The dehydrated polyimide supporting substrate 11 may be used either as it is or with a coating of protection or passivation layer to prevent possible reaction between the polyimide supporting substrate 11 and the lithium intercalation compound or lithium which forms the cathode 14. This passivation layer can increase the life of the battery. The passivation layer may be a layer of LiPON or a layer of parylene.

Next, a layer of nickel or gold is deposited upon the polyimide supporting substrate 11 to form a cathode current collector 13. Because of the cost of such materials, nickel is used herein as the preferred embodiment. The nickel cathode current collector 13 is formed by DC magnetron sputtering of a nickel target with 5 mtorr of argon atmosphere. The nickel cathode current collector 13 is preferably between 0.01 to 1 micron in thickness. The nickel cathode current collector has shown to have very good adhesion qualities to the polyimide supporting substrate while also providing very good conductivity.

Next, the combination of the polyimide supporting substrate and cathode current collector 13 is positioned under an infrared lamp for approximately 15 minutes at temperatures above 70 degrees Celsius in order to drive out absorbed moisture from the polyimide material. The cathode layer 14 is then deposited upon the cathode current collector 13. The deposition target is pre-sputtered for 5 minutes at 3 $W/cm^2$ RF power using 30 mtorr of argon gas. A LiCoO2 layer is then deposited upon the combination of cathode current collector and polyimide supporting substrate 11 to a thickness of approximately 1 to 4 microns. The $LiCoO_2$ is deposited with 3 $W/cm^2$ RF power using an atmosphere of 30 mtorr of argon and oxygen ($Ar:O_2=20:1$) mixture. The maximum steady state temperature reached during the deposition process is 150 degrees Celsius.

The $LiCoO_2$ cathode may be repeatedly treated by low energy RF plasma during the deposition process. After every 1,000 to 5,000 angstroms of $LiCoO_2$ cathode is deposited the applied power is reduced to the point hat there is not effective sputtering taking place. However, there is still enough low energy plasma present on the surface of the substrate. The substrate bias (from 1 to 20% of the applied power during the deposition process) is adjusted to increase the ion bombardment and crystallize the $LiCoO_2$ films by plasma treatment. Every treatment may last from 1 min to 30 minutes, depending upon the thickness of the newly deposited film. The substrate bias can also be used to effectively control the stress of the $LiCoO_2$ layer during, the sputtering process. Another parameter which can be used to control the $LiCoO_2$ stress is the phase difference between applied power and substrate bias (from 0 to 90 degrees) during the sputtering process. $LiCoO_2$ films deposited upon a polyimide substrate can also be post-annealed at a temperature of between 300 and 350 degrees Celsius for one hour to enhance their crystalline structures.

The LiPON electrolyte 15 is then deposited upon the cathode 14. The LiPON electrolyte 15 deposition involves reactive sputtering of lithium orthophosphate in a nitrogen plasma to incorporate nitrogen into the film structure. The deposition pressure may be varied from 2 mtorr to 40 mtorr. The electrolyte 15 thickness may be between 1 to 2 microns and may be formed in the following manner. The combination substrate, cathode current collector and cathode is placed under an infrared lamp to heat the combination to a temperature between 70 and 100 degrees Celsius for 15 minutes in order to drive out moisture from the substrate 11. The cathode layer is then cleaned again with the use of a $CO_2$ spray to remove any particles thereon before the combination is positioned in the load-lock chamber of the sputtering device. The chamber has a base pressure of approximately $10^{-7}$ torr. The sputtering target is pre-sputtered for 5 to 30 minutes at 1.6 $W/cm^2$ RF power using 5 mtorr of nitrogen gas. After the pre-sputtering process, the battery cell combination is transferred from the load-lock chamber to the deposition chamber. A LiPON electrolyte 15 film is then deposited upon the combination of the substrate/cathode current collector/cathode at 1.6 $W/cm^2$ RF power using 5 mtorr of nitrogen gas.

The anode 16 is then deposited upon the electrolyte 15 by DC sputtering of a tin metal target in a nitrogen atmosphere. The base pressure of the sputtering chamber is approximately $10^{-6}$ torr. The resulting $Sn_3N_4$ film is deposited with DC power of 0.65 $W/cm^2$ and a processing pressure of 15 mtorr of nitrogen-gas. The metal layer is then deposited upon the top of the $Sn_3N_4$ anode to form an anode current collector 17.

Alternatively, lithium may be used as the anode material. In such a case, a finished half-cell of supporting substrate, cathode current collector, cathode, and electrolyte is transferred to a thermal evaporation chamber with an argon filled glove box. The lithium metal is then thermally evaporated onto the electrolyte to form an anode with a thickness of between 1 to 3 microns.

The battery cell may now be treated with a passivation layer to protect it from harmful ambient elements. As such, the cell may be treated with a 2 micron layer of parylene, which also enhances the integrity of the battery during the subsequent handling, packaging and bending during practical applications.

It should be understood that masks are utilized during the deposition process of each step in order to control the area upon which the deposition occurs.

Figure 4:
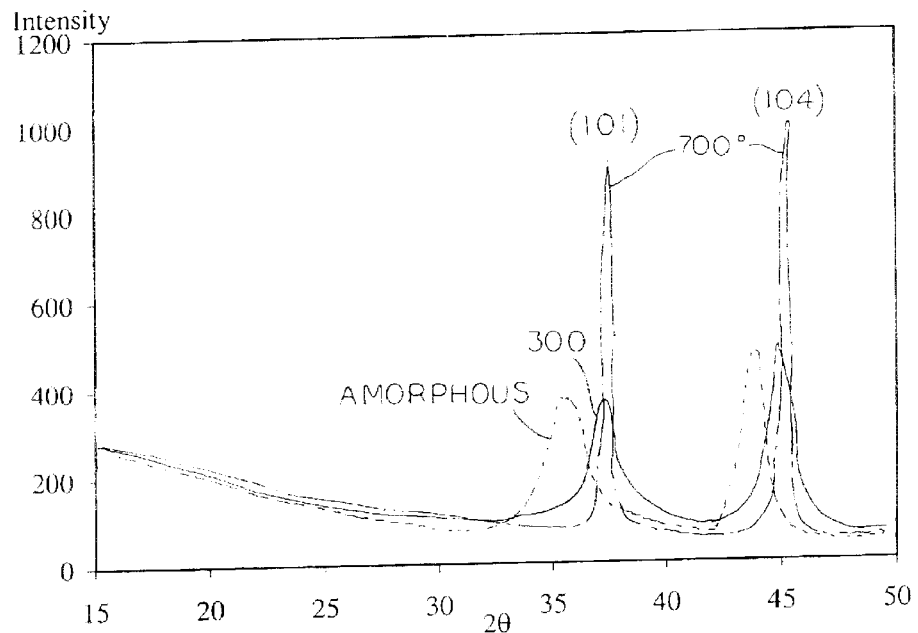
FIG. 4 is an x-ray diffraction graph of different cathodes.

A battery cell manufactured in the just described manner has very good adhesion qualities between the polyimide supporting substrate and the overlying layers of battery components. Furthermore, even though the 300 degree Celsius temperature does not produce full crystallization of the $LiCoO_2$, the battery cell still has excellent form and performance. As shown in FIG. 4, the small broad peaks P1 and P2 in the x-ray diffraction associated with an amorphous cathode 101 and 104 reflections, that are usually already present for the "as deposited" films, shift to the right or towards the peak position for the fully formed structure as shown by peaks P3 and P4 of cathodes of the present invention. This x-ray diffraction data indicates that the 300 degree Celsius annealing of the $LiCoO_2$ during the present process exhibits the same peak locations P3 and P4 as $LiCoO_2$ cathodes annealed at 700 degrees Celsius which are shown by peaks P5 and P6. The difference being that the relative peak heights of P3 and P4 are smaller than those (P5 and P6) annealed at the higher temperature. This means that the LiCoO2 films deposited under the current process are largely crystallized to the preferred orientation.

Figure 5A:
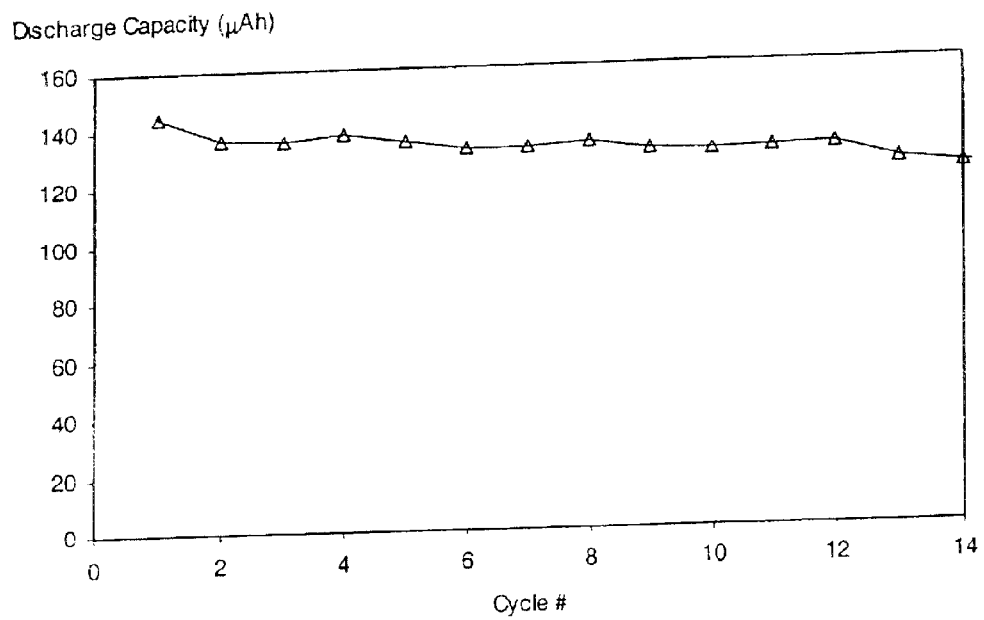
FIG. 5A is a voltage capacity profile of a thin film battery annealed at 700 degrees Celsius.
Figure 5B:
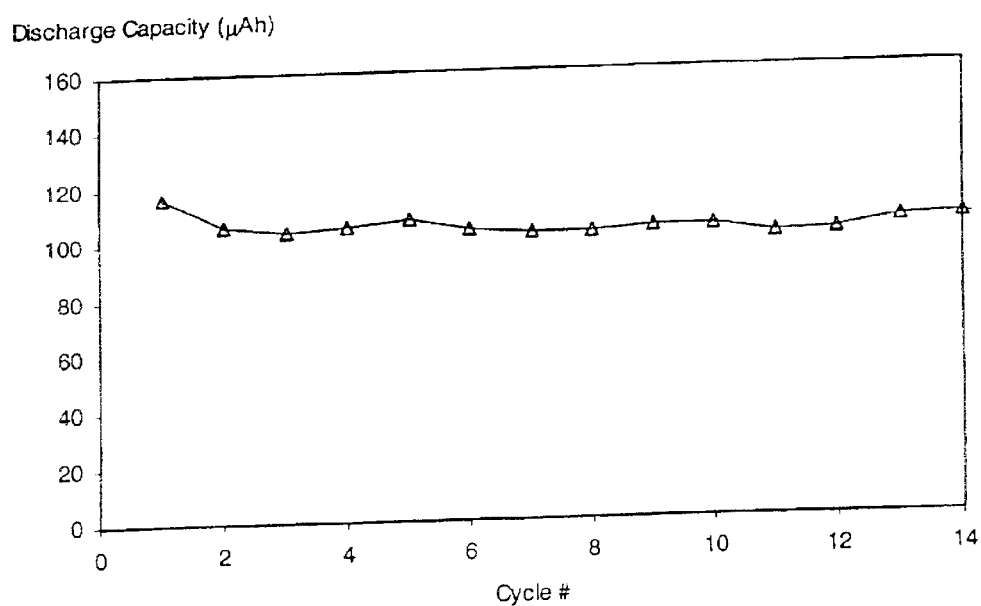
FIG. 5B is a voltage capacity profile of a thin film battery made under the present invention.

The LiCoO2 films annealed at the high temperature of 700 degrees Celsius (group A), shown in FIG. 5A, and those of the current invention's low temperature process of 300 degrees Celsius (group B), shown in FIG. 5B, also exhibit similar capacity. It is seen that the average capacity of the battery of group B (300 degree Celsius) is approximately 20% less than those of group A (700 degrees Celsius). This comparison is very close when compared to previous low temperature processes of the prior art which had a much greater difference in capacity. Furthermore, the long-term capacity fade, i.e. the number of times the battery may be cycled, of these two groups are also very similar, as shown by the comparison of FIGS. 5A and 5B. Again, this provides a benefit over the prior art's low temperature manufactured cathodes.

It should be understood that the term dehydrated polyimide is not intended to means a polyimide which is completely void of all water. The term, as used herein, is intended to mean a polyimide material in which the great majority of naturally occurring or absorbed moisture or water within the material is driven out through the heating process.

It thus is seen that a high rate capability battery is now provided which is lighter and smaller than those of the prior art. It should of course be understood that many modifications may be made to the specific preferred embodiment described herein without departure from the spirit and scope of the invention as set forth in the following claims.

What is claimed is:

1. A thin film lithium battery comprising:

a polyimide support substrate;

a cathode current collector mounted upon said polyimide support substrate;

a crystallized lithium intercalation compound cathode coupled to said cathode current collector;

an electrolyte deposited upon said lithium intercalation compound cathode;

an anode deposited upon said electrolyte; and an anode current collector coupled to said anode.

2. The thin film lithium battery of claim 1 wherein said polyimide support substrate is a dehydrated polyimide material.

3. The thin film lithium battery of claim 1 wherein said polyimide support substrate of a poly(pyromellitimide-1,4-diphenyl ether) material.

4. The thin film lithium battery of claim 3 wherein said polyimide support substrate is a dehydrated polyimide material.

5. The thin film lithium battery of claim 1 further comprising a passivation layer is positioned between said polyimide support substrate and said crystallized lithium intercalation compound cathode.

6. The thin film lithium battery of claim 5 wherein said passivation layer is a parylene material.

7. The thin film lithium battery of claim 5 wherein said passivation layer is a lithium phosphorus oxynitride material.

8. A thin film lithium battery comprising:

a polyimide support substrate;

a passivation layer deposited upon said polyimide support substrate;

a cathode current collector mounted upon said passivation layer;

a crystallized lithium intercalation compound cathode coupled to said cathode current collector;

an electrolyte deposited upon said lithium intercalation compound cathode;

an anode deposited upon said electrolyte; and an anode current collector coupled to said anode.

9. The thin film lithium battery of claim 8 wherein said polyimide support substrate is a dehydrated polyimide material.

10. The thin film lithium battery of claim 8 wherein said polyimide support substrate of a poly(pyromellitimide-1, 4-diphenyl ether) material.

11. The thin film lithium battery of claim 10 wherein said polyimide support substrate is a dehydrated polyimide material.

12. The thin film lithium battery of claim 8 wherein said passivation layer is a parylene material.

13. The thin film lithium battery of claim 8 wherein said passivation layer is a lithium phosphorus oxynitride material.

* * * * *